United States Patent Office 3,576,609
Patented Apr. 27, 1971

---

3,576,609
STABLE COVALENT DIBORANE DIAMMONIATE AND ITS PREPARATION
Joseph M. Makhlouf, Mars, Pa., assignor to Mine Safety Appliances Company, Pittsburgh, Pa.
No Drawing. Continuation-in-part of application Ser. No. 448,567, Apr. 8, 1965. This application Dec. 24, 1968, Ser. No. 786,753
Int. Cl. C01l 6/22
U.S. Cl. 23—358                       1 Claim

ABSTRACT OF THE DISCLOSURE

A new covalent diborane diammoniate, $B_2H_6(NH_3)_2$, is prepared by reaction of diborane and ammonia in methylene chloride.

---

This application is a continuation-in-part of my copending application Ser. No. 448,567, filed Apr. 8, 1965, now U.S. Pat. 3,437,456.

This invention relates to a new diborane diammoniate and a method for its preparation.

A variety of compounds of ammonia and diborane having the empirical formula $BNH_6$ are known, differing methods of carrying out the reaction yielding different products. Diborane diammoniate having the formula $$(H_3NBH_2NH_3)(BH_4)$$

has been prepared by the low temperature reaction, e.g. below $-78°$ C., of diborane and excess ammonia wherein the excess ammonia is pumped from the reaction mixture at $-78°$ C., which method is not practical for commercial scale production. (Parry et al., J.A.C.S. 80, 11 (1958).)

This invention is based on my discovery that diborane and ammonia react in methylene chloride to form a precipitate of diborane diammoniate that is distinctly different from ionic diborane diammoniate of the formula $$(H_3NBH_2NH_3)(BH_4)$$

The new diborane diammoniate is covalent, that is, the two ammonias have coordinated with diborane but the bridge hydrogen bonds in the diborane have not cleaved, and it can be converted to the ionic form by heating to about 60° C. or by further reaction with ammonia-methylene chloride solution. The new diborane diammoniate of this invention is identified hereinafter by the formula $B_2H_6(NH_3)_2$.

In an example of this invention, 60 mmols of ammonia was condensed into 200 ml. of ethylene chloride contained in a suitable reaction vessel, and 30 mmols of diborane carried by a stream of $N_2$ was then bubbled into the ammonia-methylene chloride solution. A solid diborane diammoniate, $B_2H_6(NH_3)_2$, precipitated promptly from the solution. The reaction mixture was allowed to warm to room temperature and the solid product was filtered from the reaction mixture and vacuum dried. The product so recovered was an 81.5% yield of substantially pure $B_2H_6(NH_3)_2$. The elemental analysis of the product was 35.2% boron (by Micro Schoeniger), 19.4% hydrogen (by microcombustion) and 42.6% (by Micro Dumas, which method generally gives somewhat low results), compared to the theoretical elemental content of $$B_2H_6(NH_3)_2$$

of 35.0% boron, 19.5% hydrogen and 45.3% nitrogen. The $B_2H_6(NH_3)_2$ gives a definite X-ray powder pattern distinctly different from that of $(H_3NBH_2NH_3)BH_4$ and of ammonia borane $BH_3NH_3$ as shown in Table I.

TABLE I
[X-ray diffraction (CuKα radiation)]

| $B_2H_6(NH_3)_2$ | | $(H_3NHB_2NH_3)(BH_4)_1$ | | $NH_3BH_3$ [2] | |
|---|---|---|---|---|---|
| Intensity | d., A. | Intensity | d., A. | Intensity | d., A |
|  |  | w | 7.60 |  |  |
|  |  | vw | 6.69 |  |  |
|  |  | w | 5.99 |  |  |
|  |  | w | 5.37 |  |  |
|  |  | w | 5.13 |  |  |
| m | 4.70 |  |  |  |  |
|  |  | vs | 4.63 |  |  |
| s | 4.40 |  |  |  |  |
|  |  | vs | 4.25 |  |  |
| m | 4.05 | w | 4.05 |  |  |
|  |  | w | 3.88 |  |  |
| w | 3.80 |  |  |  |  |
|  |  |  |  | vvs | 3.72 |
| w | 3.65 |  |  | vs | 3.65 |
|  |  | vw | 3.62 |  |  |
|  |  | vs | 3.50 |  |  |
| s  | 3.45 |  |  |  |  |
| w  | 3.15 |  |  |  |  |
|  |  | vw | 3.10 |  |  |
| m | 2.95 | m | 2.93 |  |  |
| m | 2.85 | m | 2.83 |  |  |
| w | 2.69 | m | 2.68 |  |  |
|  |  |  |  | s | 2.63 |
|  |  | m | 2.59 |  |  |
|  |  | w | 2.51 | ms | 2.52 |
| w | 2.48 |  |  |  |  |
|  |  | w | 2.40 |  |  |
|  |  | m | 2.31 |  |  |
| vw | 2.25 |  |  |  |  |
|  |  | w | 2.14 | s 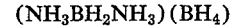 | 2.13 |
|  |  | m | 2.089 | ms | 2.09 |
|  |  |  |  | ms | 1.60 |

[1] Shore and Boddeker 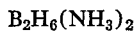 Chem. 3, 915.
[2] Shore and Parry, J. Am. Chem. Soc. 77, 6084.
NOTE.—s, strong; m, medium; w, weak; v, very.

The infrared spectra of the $B_2H_6(NH_3)_2$ shows similarities to that of $(H_3NBH_2NH_3)(BH_4)$, but shows a complete absence of the $BH_4$ ion. Thus both materials show N—H (3.05μ band) and B—H (4.05 and 4.4μ band) bonds. In addition, the following unassigned absorption bands are common to both materials: 6.2, 7.1, 8.4, 9.2, 9.8, 11.8, 12.7 and 14.7μ. $(H_3NBH_2NH_3)(BH_4)$ has a band at 8.9μ that is considered specific for the $BH_4^-$ ion; the $B_2H_6(NH_3)_2$ has no absorption band at 8.9μ. In addition, the $B_2H_6(NH_3)_2$ has a 8.3μ band appearing as a shoulder on the 8.4μ band that is absent from the spectra of $(H_3NBH_2NH_3)(BH_4)$.

$B_2H_6(NH_3)_2$ differs significantly from $$(NH_3BH_2NH_3)(BH_4)$$

and from $NH_3BH_3$. $NH_3BH_3$ is not reactive with methanol and $(NH_3BH_2NH_3)(BH_4)$ is only slowly reactive with methanol to evolve hydrogen, while $B_2H_6(NH_3)_2$ reacts vigorously and rapidly with methanol.

$$(NH_3BH_2NH_3)(BH_4)$$

and $NH_3BH_3$ react rapidly with HCl in ethyl ether while $B_2H_6(NH_3)_2$ is completely non-reactive. The $B_2H_6(NH_3)_2$ thus can be used as a reducing agent in acid media in which the $(NH_3BH_2NH_3)(BH_4)$ cannot be used.

The $B_2H_6(NH_3)_2$ can be converted to the ionic form by contact with a solution of ammonia in methylene chloride at temperatures below about 0° C. For example, the $B_2H_6(NH_3)_2$ produced in the aforementioned example was contacted at $-78°$ C. with a solution of 60 mmols of ammonia in 200 ml. of methylene chloride for 40 hours, after which time the reaction mixture was warmed to room temperature and the solid product was filtered from the reaction mixture and vacuum dried. The product was substantially pure $(H_3NBH_2NH_3)(BH_4)$ as determined by elemental infrared and X-ray analysis.

In the preparation of $B_2H_6(NH_3)_2$ the proportions of ammonia and diborane used are not critical, but it is preferred to use the stoichiometric amounts, that is, 2 mols of ammonia for each mol of diborane, as an excess of either reactant does not appear to give any special advantage. When an excess of ammonia is used, the $$B_2H_6(NH_3)_2$$

should be promptly seprated from the reaction mixture to prevent the conversion to $(NH_3BH_2NH_3)(BH_4)$. Any temperature below about 0° C. and above the freezing point of methylene chloride may be used, but it is preferred to use a temperature of about −78° C. to facilitate solubility of the reactants. The filtration of the precipitated reaction product can be performed at reaction temperature or higher temperatures, such as room temperature, if desired.

The $B_2H_6(NH_3)_2$ of this invention is useful for the generation of hydrogen by hydrolysis or alcoholysis. Hydrogen can be generated from $B_2H_6(NH_3)_2$ or $$(NH_3BH_2NH_3)(BH_4)$$

by spontaneous reaction when ignited at high temperatures. The diborane diammoniates may also be thermally decomposed to produce boron nitride. They are also useful as reducing agents and chemical intermediates for the preparation of other boron-nitrogen compounds, for example $B_2H_6(NH_3)_2$ reacts with methanol to form methyl borate $(MeO)_3B$ and ammonia borane $(NH_3BH_3)$.

According to the provisions of the patent statutes, I have explained the principle and mode of practicing my invention and have described what I now consider to be its best embodiments. However, I desire to have it understood that, within the scope of the appended claim, the invention may be practiced otherwise than as specifically described.

I claim:
1. A diborane diammoniate having the formula

$$B_2H_6(NH_3)_2$$

and X-ray powder diffraction pattern having bands of the following intensity and spacing: medium, 4.70 A.; strong, 4.40 A.; medium, 4.05 A.; weak, 3.80 A.; weak, 3.65 A.; strong 3.45 A.; weak, 3.15 A.; medium, 2.95 A.; medium, 2.85 A.; weak, 2.69 A.; weak, 2.48 A.; very weak, 2.25 A.; and an infrared spectrum pattern having absorption bands at $3.05\mu$, $4.05\mu$, $4.4\mu$, $6.2\mu$, $7.1\mu$, $8.3\mu$, $8.4\mu$, $9.2\mu$, $9.8\mu$, $11.8\mu$ $12.7\mu$, and $14.7\mu$.

References Cited

Schlesinger et al.: The Reaction of Diborane With Ammonia at −120° C., J.A.C.S., vol. 60 (1938), p. 294.

OSCAR R. VERTIZ, Primary Examiner

H. S. MILLER, Assistant Examiner